US006953275B2

(12) United States Patent
Ferri et al.

(10) Patent No.: US 6,953,275 B2
(45) Date of Patent: Oct. 11, 2005

(54) SYSTEM AND METHOD FOR PROVIDING A UNIFORM SOURCE OF LIGHT

(75) Inventors: John M. Ferri, Oak Park, CA (US); Karl H. Gensike, Westlake Village, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/849,265

(22) Filed: May 19, 2004

(65) Prior Publication Data

US 2004/0233679 A1 Nov. 25, 2004

Related U.S. Application Data

(60) Provisional application No. 60/472,499, filed on May 21, 2003.

(51) Int. Cl.[7] ............................ F21V 11/00; F21V 7/04; G02B 5/02; H01J 5/16; H01P 5/00

(52) U.S. Cl. ....................... 362/558; 362/560; 362/561; 385/31

(58) Field of Search ......................... 362/558, 560–561, 362/326, 334, 335, 340, 551, 554, 556, 582; 385/31

(56) References Cited

U.S. PATENT DOCUMENTS

| | | | | | |
|---|---|---|---|---|---|
| 3,913,872 | A | * | 10/1975 | Weber | 362/554 |
| 4,373,775 | A | * | 2/1983 | Gasparian | 385/47 |
| 4,460,940 | A | * | 7/1984 | Mori | 362/558 |
| 4,656,562 | A | | 4/1987 | Sugino | |
| 5,296,892 | A | * | 3/1994 | Mori | 355/67 |
| 5,307,207 | A | * | 4/1994 | Ichihara | 359/622 |
| 5,386,250 | A | * | 1/1995 | Guerinot | 348/770 |
| 5,414,489 | A | * | 5/1995 | Kaplan | 355/67 |
| 5,463,497 | A | * | 10/1995 | Muraki et al. | 359/618 |
| 5,581,683 | A | * | 12/1996 | Bertignoll et al. | 385/146 |
| 5,610,763 | A | * | 3/1997 | Kudo | 359/619 |
| 5,625,738 | A | * | 4/1997 | Magarill | 385/146 |
| 5,634,704 | A | * | 6/1997 | Shikama et al. | 353/31 |
| 5,636,003 | A | * | 6/1997 | Tanitsu et al. | 355/67 |
| 5,662,410 | A | * | 9/1997 | Suganuma | 362/268 |
| 5,680,257 | A | * | 10/1997 | Anderson | 359/727 |
| 5,829,858 | A | * | 11/1998 | Levis et al. | 353/122 |
| 5,867,320 | A | * | 2/1999 | Park et al. | 359/618 |
| 5,870,296 | A | | 2/1999 | Schaffer | 363/65 |
| 5,975,703 | A | * | 11/1999 | Holman et al. | 353/20 |
| 6,005,722 | A | * | 12/1999 | Butterworth et al. | 359/712 |
| 6,137,631 | A | * | 10/2000 | Moulin | 359/618 |
| 6,155,687 | A | | 12/2000 | Peterson | |
| 6,205,271 | B1 | * | 3/2001 | Bowron et al. | 385/31 |
| 6,236,449 | B1 | * | 5/2001 | Tanitsu | 355/67 |
| 6,243,149 | B1 | * | 6/2001 | Swanson et al. | 349/62 |
| 6,246,450 | B1 | * | 6/2001 | Inbar | 349/5 |
| 6,249,382 | B1 | * | 6/2001 | Komatsuda | 359/618 |
| 6,260,974 | B1 | * | 7/2001 | Koyama | 353/98 |
| 6,272,269 | B1 | * | 8/2001 | Naum | 385/43 |
| 6,285,423 | B1 | * | 9/2001 | Li et al. | 349/96 |
| 6,341,876 | B1 | * | 1/2002 | Moss et al. | 362/268 |
| 6,343,862 | B1 | * | 2/2002 | Sawai et al. | 353/1 |
| 6,375,330 | B1 | * | 4/2002 | Mihalakis | 353/31 |
| 6,377,336 | B1 | * | 4/2002 | Shiraishi et al. | 355/67 |
| 6,396,647 | B1 | * | 5/2002 | Chen | 359/738 |
| 6,419,365 | B1 | * | 7/2002 | Potekev et al. | 353/98 |
| 6,428,198 | B1 | * | 8/2002 | Saccomanno et al. | 362/559 |
| 6,452,088 | B1 | * | 9/2002 | Schmidt | 136/244 |

(Continued)

*Primary Examiner*—Stephen Husar
*Assistant Examiner*—Jason Han
(74) *Attorney, Agent, or Firm*—Allen, Dyer, Doppelt, Milbrath & Gilchrist, P.A.

(57) ABSTRACT

A system for providing a uniform source of light. The system includes a light pipe having an input surface for receiving light from a light source and an output surface for transmitting the light. The system also includes an optical element having an entrance surface positioned adjacent to the output surface of the light pipe for receiving the light and an exit surface for transmitting the light.

21 Claims, 3 Drawing Sheets

U.S. PATENT DOCUMENTS

| | | | | | |
|---|---|---|---|---|---|
| 6,505,957 | B2 | * | 1/2003 | Chuang | 362/268 |
| 6,508,571 | B2 | * | 1/2003 | Chuang | 362/237 |
| 6,517,211 | B2 | * | 2/2003 | Mihara | 353/98 |
| 6,533,427 | B2 | * | 3/2003 | Chang | 362/19 |
| 6,549,339 | B2 | * | 4/2003 | Choi et al. | 359/634 |
| 6,554,464 | B1 | * | 4/2003 | Hawryluk et al. | 362/582 |
| 6,558,007 | B2 | * | 5/2003 | Nakagawa et al. | 353/98 |
| 6,578,999 | B2 | * | 6/2003 | Schmidt et al. | 362/556 |
| 6,587,269 | B2 | * | 7/2003 | Li | 359/497 |
| 6,655,820 | B2 | * | 12/2003 | Jung et al. | 362/318 |
| 6,672,724 | B1 | * | 1/2004 | Peterson et al. | 353/81 |
| 6,698,891 | B2 | * | 3/2004 | Kato | 353/20 |
| 6,715,880 | B2 | * | 4/2004 | Shouji | 353/20 |
| 6,739,723 | B1 | * | 5/2004 | Haven et al. | 353/20 |
| 6,796,686 | B2 | * | 9/2004 | Jacob et al. | 362/293 |
| 6,798,577 | B2 | * | 9/2004 | Mizouchi | 359/619 |
| 6,827,450 | B1 | * | 12/2004 | McGettigan et al. | 353/31 |
| 6,830,342 | B2 | * | 12/2004 | Lee | 353/84 |
| 2003/0031029 | A1 | * | 2/2003 | Kawaai et al. | 362/551 |
| 2003/0086066 | A1 | | 5/2003 | Kato | 353/20 |

* cited by examiner

OUTPUT SURFACE OF LIGHT PIPE

MICRODISPLAY PLANE

SYSTEM AND METHOD FOR PROVIDING A UNIFORM SOURCE OF LIGHT

CROSS-REFERENCE TO RELATED APPLICATION

This application is based upon and claims the benefit of priority from the prior U.S. Provisional Patent Application No. 60/472,499, filed May 21, 2003, the entire contents of which are incorporated herein by reference.

FIELD OF THE INVENTION

The invention relates generally to illumination systems and methods for projection display devices, and more particularly to systems and methods for providing a uniform source of light.

BACKGROUND OF THE INVENTION

Projection display devices often include optical elements and a uniform light source to illuminate the optical elements. Many light sources, however, are not sufficiently spatially uniform to illuminate the projection display devices. Light pipes are commonly used to improve the uniformity of the light produced by such non-uniform light sources, thereby creating a uniform light source for illumination optics in projection display devices. Light pipes are generally configured in one of two common forms: (1) as a hollow tunnel, in which a pipe has a highly reflective inner wall (e.g., has a highly reflective coating on its inner wall), or (2) as a solid member, in which a solid glass rod has an optically transparent medium. In form (2), the light pipe relies on total internal reflection (TIR) to contain the light within the solid member. The light pipe may also be (3) a clad light pipe. The clad light pipe is a light pipe that has a thin coating or layer of material (e.g., glass or plastic) that surrounds (except for the ends) the light pipe. The coating or layer has a lower index of refraction as compared to the light pipe.

The light pipe may have an input end (or input face) configured to receive the light, which may be from the light source providing non-uniform light, and an output end (or output face) configured to emit the light. The input and output ends may have an anti-reflective coating to improve the transmission efficiency of the light pipe. As the light passes from the input end to the output end, the light pipe may be configured to allow the light to interfere or mix through multiple reflections. Consequently, the light exiting the output end of the light pipe may be substantially more spatially uniform than the light entering the input end of the light pipe. Accordingly, the light pipe may substantially improve the uniformity of the light provided by the light source, resulting in a highly uniform light source. In projection display devices, the output end of the light pipe is generally imaged to a microdisplay device. The microdisplay device is then re-imaged by a projection lens onto a screen viewed by an audience.

Some drawbacks of using the solid light pipe are that the output face may obtain structural defects (e.g., scratches, edge chips or pits), coating defects (e.g., discoloration) or surface contaminants (e.g., dust, oil, dirt, fingerprints, etc.), all of which alter the image shown on the screen. That is, the edge chips may cause light leakage, "crow's feet" artifacts, image artifacts and bonding problems. Also, the dust may cause dark areas to appear on the screen. For example, the dust may collect on and/or fuse to the output face due to the high temperatures at the input and output faces of the light pipe. The dust may create dark areas on the output face of the light pipe, ultimately resulting in dark areas appearing on the screen, thus adversely affecting the quality of the image viewed by the audience. In the past, the dark areas have been minimized by creating a dust free environment for the input and output faces of the light pipe. This solution, however, is typically inconvenient and may add significant cost and complexity to the apparatus surrounding the light pipe, the optical elements and the entire projection display device.

Another drawback of using a conventional light pipe approach is that the illumination is performed obliquely when using a microdisplay device such as a digital micromirror device (DMD) (e.g., a DMD from Texas Instruments as found in digital light processing (DLP) projectors). In such systems, the DMD plane is tilted with respect to the incoming illumination light and the optical axis of the illumination system. Effectively, this means that the image of the output face of the light pipe is tilted with respect to the DMD plane, and the two planes share only a single line of common focus. In an ideal situation, the two planes would be coincident. Undesirable effects due to this tilted illumination system and non-coincident focus include blurred edges to the lightbox, degraded illumination uniformity and efficiency losses.

Accordingly, it should be appreciated that there is a need for a system and method for providing a uniform source of light. The invention fulfills this need as well as others.

SUMMARY OF THE INVENTION

It is an object of the invention to provide a system and method for eliminating dust and coating defect problems at the end of a solid light pipe. It is also an object of the invention to provide a system and method for efficiently illuminating a tilted, or off-axis, display device or for efficiently illuminating display devices at an oblique angle. The illumination systems of the invention can include the optical elements from the light source to the microdisplay. The optical elements may include, but are not limited to, microdisplays, relay optics, filters, prisms, mirrors, retarders, and polarization components.

One embodiment of the invention is a system for providing a uniform source of light. The system includes a light pipe having an input surface for receiving light from a light source and an output surface for transmitting the light. The system also includes an optical element having an entrance surface positioned adjacent to the output surface of the light pipe for receiving the light and an exit surface for transmitting the light. The output surface of the light pipe is imaged onto a microdisplay device.

One embodiment of the invention is an illumination system including a light pipe having an input surface defining a first plane and configured to receive light and an output surface configured to propagate the light. The illumination system also includes an optical element having an entrance surface connected to the output surface of the light pipe and an exit surface defining a second plane that is substantially parallel to the first plane.

One embodiment of the invention is an optical system including a light source for producing a light beam and a light pipe having an input surface defining an input plane for receiving the light beam from the light source and an output surface defining an output plane. The optical system also includes an optical device having an entrance surface in contact with the output surface of the light pipe and an exit surface defining an exit plane where the output plane is tilted with respect to the exit plane. Hence, the output plane intersects the exit plane.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Reference will now be made to the preferred embodiments of the invention, examples of which are illustrated in the accompanying drawings. While the invention will be described in conjunction with the preferred embodiments, it will be understood that these embodiments are not intended to limit the scope of the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the invention. However, it will be understood by one skilled in the art that the invention may be practiced without these specific details. In other instances, well known systems, components, methods and procedures have not been described in detail so as not to unnecessarily obscure the important aspects of the invention. As will be appreciated, various embodiments of the invention are described herein and shown in the figures.

Figure 1A:
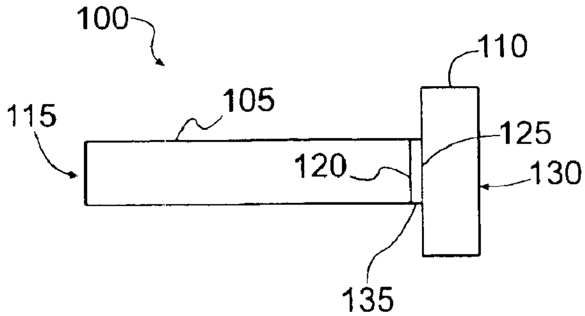
FIG. 1A is a side view of an illumination system including a light pipe and a plate attached to or positioned adjacent to the light pipe according to an embodiment of the invention.

FIG. 1A is a side view of an illumination system 100 including a light pipe 105 and a plate 110 attached to or positioned adjacent to the light pipe 105. The light pipe 105 has an input surface 115 for receiving light from a light source and an output surface 120 for emitting the light. The input surface 115 defines an input plane. The light enters the light pipe 105 at the input surface 115, mixes inside the light pipe 105 through multiple internal reflections and exits the light pipe 105 at the output surface 120. The light pipe 105 may be made of a solid optically transmissive material, such as glass, plastic or other optical material capable of exhibiting TIR and having an index of refraction. The light pipe 105 may be formed in the shape of a polygon (e.g., 4-sided polygon), trapezoid, parallelogram, hexagon, square, rectangle, cylinder, oval, circle or any other shape that allows for the transmission of light.

The plate 110 has an entrance surface 125 for receiving the light from the output surface 120 of the light pipe 105 and an exit surface 130 for emitting the light. The output surface 120 of the light pipe 105 is imaged onto a microdisplay device. The entrance surface 125 of the plate 110 is positioned adjacent to, and preferably in optical contact with, the output surface 120 of the light pipe 105. The exit surface 130 defines an exit plane that is substantially perpendicular to an optical axis defined by the light traveling through the light pipe 105. The output surface 120 defines an output plane. In some embodiments, the output plane may be tilted with respect to or parallel to the input plane and/or the exit plane. In some embodiments, the input plane may be tilted with respect to or parallel to the output plane and/or the exit plane.

The plate 110 may be made of a solid optically transmissive material, such as glass, plastic or other optical material capable of exhibiting TIR and having an index of refraction. Preferably, the plate 110 is made of the same material as the light pipe 105. In one embodiment, the index of refraction of the plate 110 is substantially the same as the index of refraction of the light pipe 105. The substantially similar index of refraction of the two elements minimizes Fresnel reflection losses at the interface between the light pipe 105 and the plate 110. The plate 110 may be formed in the shape of a polygon (e.g., 4-sided polygon), trapezoid, parallelogram, hexagon, square, rectangle, cylinder, oval, circle or any other shape that allows for the transmission of light.

The output surface 120 may be bonded to the entrance surface 125 using a thermally robust and optically transmissive adhesive 135. In one embodiment, the bond may be formed by "optical contacting." In one embodiment, an optically transmissive adhesive 135, manufactured by DYMAX Corporation of Torrington, Conn., can be used to adhere or attach the entrance surface 125 to the output surface 120. The optically transmissive adhesive 135 can be a clear optical cement such as an ultraviolet (UV) curing optical cement or a thermal optical cement. Generally, the optically transmissive adhesive 135 is a thin clear coating, applied between the output surface 120 and the entrance surface 125, capable of allowing the light or image to pass through the optically transmissive adhesive 135 (i.e., from the light pipe 105 to the plate 110) without blocking, destroying or substantially altering the light or image. The optically transmissive adhesive 135 can fill in any scratches, edge chips or pits that appear on the output surface 120 of the light pipe 105.

The plate 110 advantageously improves the quality of the image, as viewed by the audience, by preventing structural defects and coating defects from appearing on the output surface 120 of the light pipe 105. For example, the plate 110 substantially prevents dust from collecting on the output surface 120 of the light pipe 105. Accordingly, dust may only collect on the exit surface 130 of the plate 110, which is not a conjugate plane of the microdisplay device or the screen. The light or image appearing on the output surface 120 is imaged onto the microdisplay device or the screen. Since the plate 110 has a minimum thickness (e.g., a minimum thickness of about 1.0 millimeters (mm)), any structural defects and coating defects appearing on the exit surface 130 of the plate 110 will be out of focus as to be almost indistinguishable to the audience.

In addition, the anti-reflective coating may be moved from the output surface 120 of the light pipe 105 to the exit surface 130 of the plate 110, and therefore some or all of the imperfection artifacts visible on the final image may also be removed. Thus, the plate 110 allows for the elimination of one or more anti-reflective coatings (e.g., one on the output surface 120 and one on the entrance surface 125). The plate 110 can be attached to a mechanical part (not shown) of the illumination system 100 to accurately position the light pipe 105 so that the light or image leaving the output surface 120 of the light pipe 105 is properly imaged onto the microdisplay device or the screen. This eliminates the need to connect the mechanical part to the light pipe 105, which can affect or destroy the TIR of the light pipe 105.

Figure 1B:
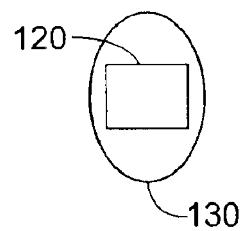
FIG. 1B is an end view of the illumination system of FIG. 1A illustrating the output surface of the light pipe and the exit surface of the plate according to an embodiment of the invention.

FIG. 1B is an end view of the illumination system 100 of FIG. 1A illustrating the output surface 120 of the light pipe 105 and the exit surface 130 of the plate 110. As illustrated in FIG. 1B, the output surface 120 is shown in the shape of a rectangle and the exit surface 130 is shown in the shape of an oval. The output surface 120 may be formed in the same or a different shape as the light pipe 105 and the exit surface 130 may be formed in the same or a different shape as the plate 110. For example, the light pipe 105 may be formed in the shape of a square and the output surface 120 may be formed in the shape of a rectangle. Also, the shape of the light pipe 105 can be the same as the shape of the plate 110. In one embodiment, the surface area of the output surface 120 is less than the surface area of the exit surface 130. In one embodiment, the perimeter of the output surface 120 is less than the perimeter of the exit surface 130.

Figure 2A:
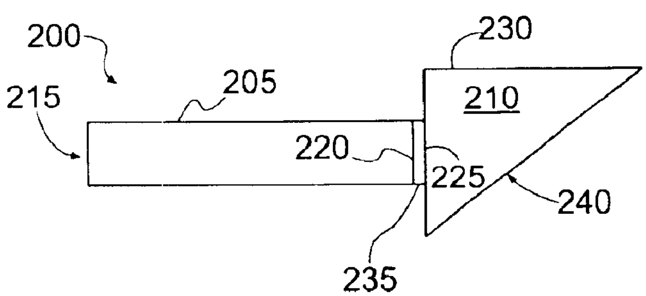
FIG. 2A is a side view of an illumination system including a light pipe and a prism attached to or positioned adjacent to the light pipe according to an embodiment of the invention.
Figure 2B:
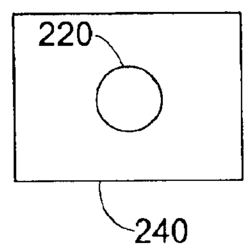
FIG. 2B is an end view of the illumination system of FIG. 2A illustrating the output surface of the light pipe and the surface of the prism according to an embodiment of the invention.

FIG. 2A is a side view of an illumination system 200 including a light pipe 205 and a prism 210 attached to or positioned adjacent to the light pipe 205. Some of the characteristics, features and functions of the prism 210 are the same or similar to the plate 110. The prism 210 can be used in situations when the light needs to be folded due to mechanical or geometric system constraints, and allows folding of rapidly converging or diverging light beams with an f-number of f/1 or even lower, which are not able to be folded using other methods such a highly reflective mirror placed in air. Hence, the prism 210 allows the light be folded while still maintaining the benefits of the invention. As the light enters the prism 210, it is reflected off a surface 240 toward and through the exit surface 230. The surface 240 may have a highly reflective coating applied to it, or in some cases the reflection is achieved by TIR. FIG. 2B is an end view of the illumination system 200 of FIG. 2A illustrating the output surface 220 of the light pipe 205 and the surface 240 of the prism 210.

Figure 3A:
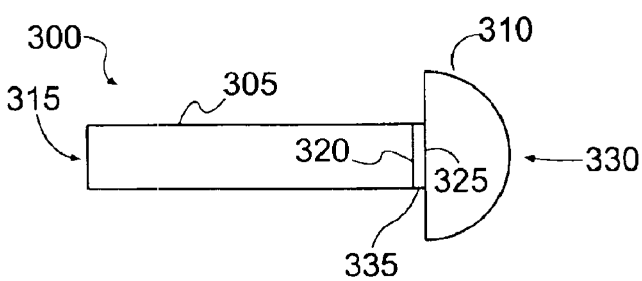
FIG. 3A is a side view of an illumination system including a light pipe and a lens attached to or positioned adjacent to the light pipe according to an embodiment of the invention.
Figure 3B:
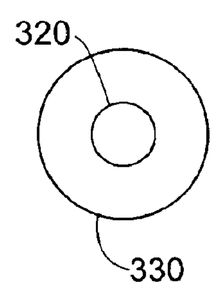
FIG. 3B is an end view of the illumination system of FIG. 3A illustrating the output surface of the light pipe and the exit surface of the lens according to an embodiment of the invention.

FIG. 3A is a side view of an illumination system 300 including a light pipe 305 and a lens 310 attached to or positioned adjacent to the light pipe 305. Some of the characteristics, features and functions of the lens 310 are the same or similar to the plate 110. One advantage of the lens 310 is that it combines the functionality of the plate 110 and an optical element of the relay lens into a single component. This eliminates the need for one or more anti-reflective coatings in the illumination system 300, thereby increasing system efficiency and lowering cost. FIG. 3B is an end view of the illumination system 300 of FIG. 3A illustrating the output surface 320 of the light pipe 305 and the exit surface 330 of the lens 310.

Figure 4A:
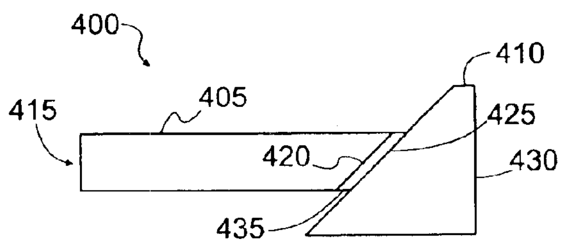
FIG. 4A is a side view of an illumination system including a light pipe and a wedge attached to or positioned adjacent to the light pipe according to an embodiment of the invention.

FIG. 4A is a side view of an illumination system 400 including a light pipe 405 and a wedge 410 attached to or positioned adjacent to the light pipe 405. As shown in FIG. 4A as an exemplary embodiment, the output surface 420 of the light pipe 405 is cleaved, angled or tilted relative to the optical axis defined by the light traveling through the light pipe 405. The tilted output surface 420 may act as a tilted object plane for optimal imaging onto a tilted or obliquely illuminated imager plane. The entrance surface 425 of the wedge 410 is cleaved, angled or tilted at substantially the same angle as the output surface 420 of the light pipe 405. That is, the wedge 410 is designed so that the entrance surface 425 of the wedge 410 is tilted at the same angle as the output surface 420 of the light pipe 405. The angle can be between about 0 degrees and about 90 degrees, and is preferably between about 3 degrees and about 8 degrees for a Texas Instruments Mustang HD-2 DLP microdisplay. If the output surface 420 is not tilted, the entrance surface 425 is similarly and substantially not tilted. The light pipe 405 may be bonded to the wedge 410.

Figure 4B:
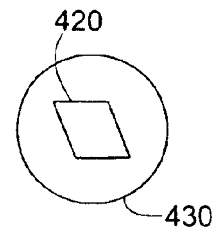
FIG. 4B is an end view of the illumination system of FIG. 4A illustrating the output surface of the light pipe and the exit surface of the wedge according to an embodiment of the invention.

The exit surface 430 of the wedge 410 may be un-tilted and may remain substantially perpendicular to the optical axis of the light traveling through the light pipe 405. That is, the input surface 415 defines a first plane and the exit surface 430 defines a second plane, where the first plane is substantially parallel to the second plane. The exit surface 430 may be coated with an anti-reflective coating or material. Some of the characteristics, features and functions of the wedge 410 are similar to the plate 110. The output surface 420 of the light pipe 405 is imaged onto the microdisplay. The tilted output surface 420 allows the image to be coincident with the plane of the microdisplay. One advantage of the wedge 410 is that it provides for Scheimpflug correction in the illumination system 400. FIG. 4B is an end view of the illumination system 400 of FIG. 4A illustrating the output surface 420 of the light pipe 405 and the exit surface 430 of the wedge 410. As shown in FIG. 4B, the output surface 420 has a polygon shape which advantageously allows for an optimized illumination area at the microdisplay plane.

The input surface 415 may be coated with an antireflective coating to reduce light loss. Accordingly, the light is confined to travel down the light pipe 405 by TIR, and through such TIR, is mixed or homogenized or otherwise rendered substantially more spatially uniform than the light entering the light pipe 405 at the input surface 415. Accordingly, the light leaving the light pipe 405 at its cleaved output surface 420 is more uniform in its irradiance. The output surface 420 is in the shape of a polygon. In one embodiment, the output surface 420 of the light pipe 405 may be uncoated. In one embodiment, the cross-section of the light pipe 405 is configured in the shape of a polygon having one or more of its sides tilted at an angle so as to cause the image of the output surface 420 of the light pipe 405 to be parallel with the sides of the micro-display device. The tilted output surface 420 advantageously provides an optimal and improved condition for imaging an image onto a tilted imager plane, such as those found in DLP projectors with and without the use of a TIR prism.

Figure 5A:
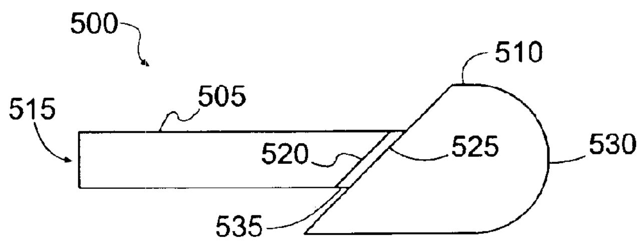
FIG. 5A is a side view of an illumination system including a light pipe and a wedged lens attached to or positioned adjacent to the light pipe according to an embodiment of the invention.
Figure 5B:
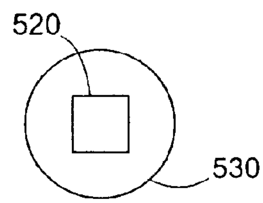
FIG. 5B is an end view of the illumination system of FIG. 5A illustrating the output surface of the light pipe and the exit surface of the wedged lens according to an embodiment of the invention.

FIG. 5A is a side view of an illumination system 500 including a light pipe 505 and a wedged lens 510 attached to or positioned adjacent to the light pipe 505. In one embodiment, an element (e.g., the prism 210, the lens 310 or the wedged lens 510) having an optical power may be positioned adjacent to or in contact with the output surface 520 of the light pipe 505 as an alternative to using an element (e.g., the plate 110) having no optical power. Positioning a powered element adjacent to or in contact with the output surface 520 the light pipe 505 advantageously combines the benefits of the plate 110, the lens 310 and the wedge 410 into a single component and enables the illumination optical relay to be simplified and/or shortened and can also improve image quality. One skilled in the art may combine one or more of the following: the plate 110, the prism 210, the lens 310, the wedge 410 and the wedged lens 510. FIG. 5B is an end view of the illumination system 500 of FIG. 5A illustrating the output surface 520 of the light pipe 505 and the exit surface 530 of the wedged lens 510.

Figure 6:
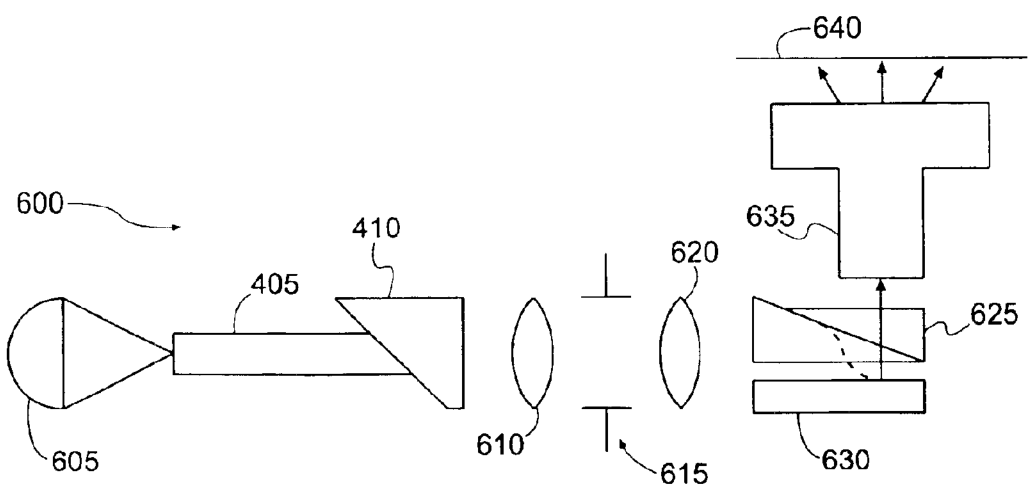
FIG. 6 illustrates an exemplary illumination system which can be used with any of the light pipes and optical elements according to an embodiment of the invention.

FIG. 6 illustrates an exemplary illumination system 600 which can be used with any of the light pipes and optical elements of the invention as described in this disclosure. The illumination system 600 can include the elements from a light source 605 to a projection screen 640. The elements may include, but are not limited to, the light source 605, the light pipe 405, the wedge 410, relay lens 610 and 620, an optical stop 615, a prism 625 (e.g., a TIR prism), a microdisplay 630 (e.g., a DMD) defining a microdisplay plane, a projection lens 635 and a projection screen 640. Other elements such as optical relays, filters, mirrors, retarders and polarization components can also be used in the illumination system 600.

Figure 7A:
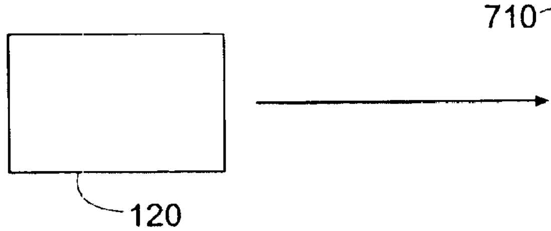
FIG. 7A is a cross-sectional view of the output surface of the light pipe according to an embodiment of the invention.
Figure 7B:
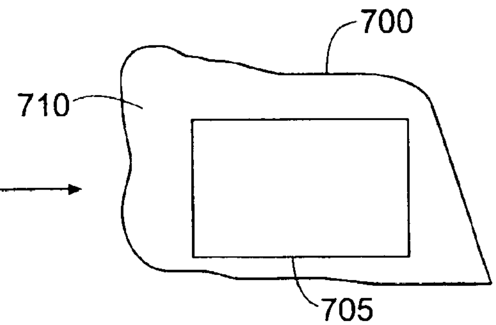
FIG. 7B illustrates the shape of the illuminated area at the microdisplay plane when the output surface of the light pipe has a rectangular shape, as well as the active area of the microdisplay according to an embodiment of the invention.

FIG. 7A is a cross-sectional view of the output surface 120 of the light pipe 105. As shown, the output surface 120 has a rectangular shape. FIG. 7B illustrates the shape of the illuminated area 710 at the microdisplay plane 700 when the output surface 120 of the light pipe 105 has a rectangular shape, as well as the active area 705 of the microdisplay 630. The active area 705 of the microdisplay 630 is generally rectangular in shape. When the output surface 120 is rectangular, the image 710 appearing on the microdisplay plane 700 has an irregular shape where an outer portion of the image 710 is out of focus. The irregular shape and the focus issue is caused by the oblique illumination of the microdisplay 630. Hence, the light intensity of the active (i.e., in focus) portion 705 of the image is reduced due to the light lost on the outer portion of the image 710.

Figure 8A:
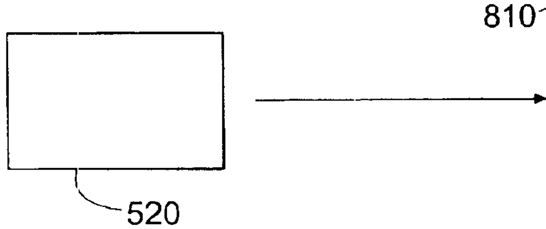
FIG. 8A is a cross-sectional view of the angled output surface of the light pipe according to an embodiment of the invention.
Figure 8B:
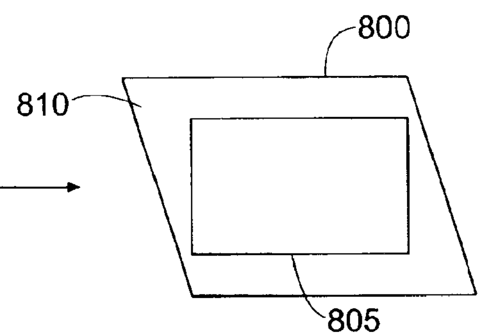
FIG. 8B illustrates the shape of the illuminated area at the microdisplay plane when the output surface of the light pipe is angled and has a rectangular shape, as well as the active area of the microdisplay according to an embodiment of the invention.

FIG. 8A is a cross-sectional view of the output surface 520 of the light pipe 505. As shown, the output surface 520 is angled and has a rectangular shape. FIG. 8B illustrates the shape of the illuminated area 810 at the microdisplay plane 800 when the output surface 520 of the light pipe 505 is angled and has a rectangular shape, as well as the active area 805 of the microdisplay 630. The active area 805 of the microdisplay 630 is generally rectangular in shape. When the output surface 520 is angled, the image 810 appearing on the microdisplay plane 800 has an irregular shape but remains substantially in focus. The angled output surface 520 advantageously provides less overfill of the image 810 on the microdisplay plane 800. Hence, less light is lost due to the out of focus portion, thus resulting in an image that has greater contrast.

Figure 9A:
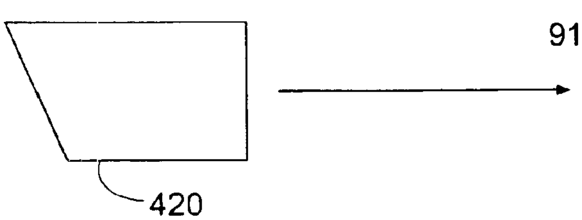
FIG. 9A is a cross-sectional view of the angled, polygonal output surface of the light pipe according to an embodiment of the invention.
Figure 9B:
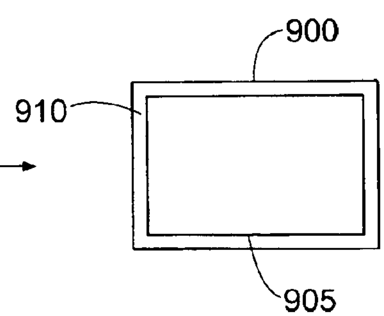
FIG. 9B illustrates the shape of the illuminated area at the microdisplay plane when the output surface of the light pipe is angled and has a polygonal shape, as well as the active area of the microdisplay according to an embodiment of the invention.

FIG. 9A is a cross-sectional view of the output surface 420 of the light pipe 405. As shown, the output surface 420 is angled and has a polygonal shape. FIG. 9B illustrates the shape of the illuminated area 910 at the microdisplay plane 900 when the output surface 420 of the light pipe 405 is angled and has a polygonal shape, as well as the active area 905 of the microdisplay 630. The active area 905 of the microdisplay 630 is generally rectangular in shape. When the output surface 420 is angled and has a polygonal cross-section, the image 910 appearing on the microdisplay plane 900 has a rectangular shape where the image is substantially in focus. The angled and polygonal output surface 420 advantageously provides a rectangular shaped image and less overfill of the image on the microdisplay plane 900. Hence, less light is lost due to the out of focus portion because of the angled and polygonal output surface 420, thus resulting in potentially more uniform, more efficient, and higher contrast illumination systems.

Some advantages of the invention include: (1) Higher degree of imaging performance when obliquely illuminating imager; (2) Reduction of tilted and decentered optical elements in illumination relay, simplifying design and reducing cost; (3) Dust artifact suppression; (4) Number of antireflective coating surfaces reduced; (4) Plate is a good surface for mounting the light pipe; (5) Elimination of coating defect artifacts relayed to imager; (6) Light exiting light pipe remains telecentric; (7) Applicability to DLP projection systems with and without a TIR prism; and (8) Increased lumen output of DLP projection system. Accordingly, the invention enables its users to more efficiently illuminate tilted or obliquely illuminated imagers while simultaneously minimizing illumination artifacts created by conventional light pipes. The invention has applications in front projection systems used in computer presentations as well as those used in the emerging rear projection monitor and television products including DLP projectors with and without a TIR prism. It also has application to high brightness projection systems, such as used in digital cinema. Thus, the invention improves the quality of available display systems. In addition, the invention provides a telecentric and uniform source of light for DLP and other obliquely illuminated micro-displays for front and rear projection applications. The invention also simplifies the illumination relay opto-mechanical design by allowing the illumination optics to remain on-axis. Light pipe designs that can be optimized for use with tilted imagers while minimizing the number of tilted or off axis illumination elements are not only more lumen efficient but also reduce the cost of illumination optics. Other advantages will be apparent to one skilled in the art.

Although exemplary embodiments of the invention has been shown and described, many other changes, combinations, omissions, modifications and substitutions, in addition to those set forth in the above paragraphs, may be made by one having skill in the art without necessarily departing from the spirit and scope of this invention. Accordingly, the invention is not intended to be limited by the preferred embodiments, but is to be defined by reference to the appended claims.

What is claimed is:

1. An optical system for providing a uniform source of light to a micro-display device defining a display plane comprising:

a light source for producing a light beam;

a light pipe for improving the uniformity of the light beam having an input surface defining an input plane for receiving the light beam from the light source and an output surface defining an output plane, which is conjugate to the display plane, whereby the output plane is imaged onto the micro-display device; and an optical device having an entrance surface in contact with the output surface of the light pipe and an exit surface defining an exit plane, whereby the optical device prevents structural defects and coating defects from appearing on the output surface of the light pipe;

wherein structural defects and coating defects appearing on the exit surface of the optical device will be out of focus on the micro-display device.

2. The optical system of claim 1, further comprising an optical relay positioned optically between the optical device and the micro-display device for imaging output plane onto the micro-display device.

3. The optical system of claim 1, wherein the output surface is in the shape of a polygon having one or more sides tilted at an angle to other sides, so that an image of the output surface appearing on the micro-display device has a substantially rectangular shape.

4. The optical system of claim 1 wherein the optical device is selected from a group consisting of a plate, a prism, a lens, a wedge and a wedged lens.

5. The optical system of claim 1 further comprising a prism positioned adjacent to the micro-display device.

6. The optical system of claim 5 wherein the prism is a total internal reflection prism.

7. The optical system of claim 1 wherein the input plane is substantially parallel to the exit plane.

8. The optical system of claim 1, wherein the output plane is tilted at an angle between 0° and 90° with respect to the exit plane.

9. The optical system of claim 8, wherein the exit surface defines a plane that is at an angle between 0° and 90° to an optical axis defined by the light traveling through the light pipe.

10. The optical system of claim 8, wherein the exit surface defines a plane that is at an angle between 0° and 8° to an optical axis defined by the light traveling through the light pipe.

11. The optical system of claim 9, wherein the entrance surface is parallel to the exit surface; and wherein the exit surface is perpendicular to the optical axis.

12. The optical system of claim 1, wherein the light pipe has a first index of refraction and the optical element has a second index of refraction that is substantially the same as the first index of refraction.

13. The optical system of claim 1, wherein the exit surface defines a plane that is substantially perpendicular to an optical axis defined by the light traveling through the light pipe.

14. The optical system of claim 1, wherein the exit surface of the optical element has a coating selected from the group consisting of a dichroic filter coating, a polarization material, and an anti-reflective coating.

15. The optical system of claim 1, wherein the output surface has a first surface area and the exit surface has a second surface area that is greater than the first surface area.

16. The optical system of claim 1, wherein the output surface has a first perimeter and the exit surface has a second perimeter that is greater than the first perimeter.

17. The optical system of claim 1, wherein the entrance surface of the optical element is connected to the output surface of the light pipe using an optically transmissive adhesive, which fills in any scratches, edge chips or pits on the output surface of the light pipe.

18. The optical system of claim 1, wherein the optical element has an optical power for imaging the output plane onto the micro-display device.

19. An optical system comprising:

a light source for producing a light beam;

a light pipe having an input surface defining an input plane for receiving the light beam from the light source and an output surface defining an output plane;

an optical device having an entrance surface in contact with the output surface of the light pipe for preventing structural defects and coating defects from appearing on the output surface of the light pipe, and an exit surface defining an exit plane where the output plane is tilted at an angle between 0° and 90° with respect to the exit plane; and a micro-display device defining a display plane that is conjugate to the output plane;

wherein structural defects and coating defects appearing on the exit surface of the optical device will be out of focus on the micro-display device.

20. The optical system of claim 19, wherein the output plane is tilted at an angle between 0° and 8°, such that an image of the output plane is coincident with the display plane.

21. The optical system of claim 20, wherein the output surface is in the shape of a polygon having one or more sides tilted at an angle to other sides so that an image of the output surface appearing on the micro-display device has a substantially rectangular shape.

* * * * *